United States Patent Office 2,806,050
Patented Sept. 10, 1957

2,806,050

REACTION OF A LACTONE AND A PHOSPHORUS COMPOUND AND PRODUCTS

Carleton B. Scott, Pomona, Calif., assignor to Union Oil Company of California, Los Angeles, Calif., a corporation of California No Drawing. Application November 14, 1955,
Serial No. 546,813

12 Claims. (Cl. 260—461)

This invention relates to new polymeric products, and in particular concerns polymers or condensation products containing phosphorus in combination with carbon, hydrogen and oxygen or sulfur. These products vary in physical form from viscous liquids to resinous or rubber-like solids depending upon their method of preparation, and are useful as extenders and plasticizing agents in synthetic resins and elastomers, as fire retardants, and as lubricant additives.

The new products provided by the invention are obtained by chemical reaction between a lactone and a lower alkyl metaphosphate or thiometaphosphate, i. e., an alkyl metaphosphate or thiometaphosphate in which the alkyl group contains from 1 to 4 carbon atoms. Analytical data and infrared spectra indicate these products to have the structure:

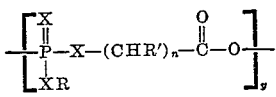

wherein R represents a lower alkyl group, R' represents hydrogen or a lower alkyl group, X represents oxygen or sulfur, $n$ is a small integer, and $y$ represents an integer corresponding to the degree of polymerization. Such postulated structure, however, has not been established with certainty, and the new products are accordingly described and claimed herein as reaction products rather than as chemical entities whose identity can be only speculative.

The alkyl metaphosphates and thiometaphosphates employed in preparing the new products have the general formula:

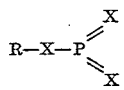

wherein R represents an alkyl group containing from 1 to 4 carbon atoms and X represents oxygen or sulfur. Examples of such compounds include methyl metaphosphate, methyl trithiometaphosphate, ethyl metaphosphate, ethyl trithiometaphosphate, isopropyl metaphosphate, n-propyl trithiometaphosphate, n-butyl metaphosphate, sec.-butyl trithiometaphosphate, etc. The alkyl metaphosphates may be obtained by reaction between a lower alkyl ether and phosphorus pentoxide. As is disclosed in my copending application, Serial No. 508,821, filed May 16, 1955 now U. S. Patent No. 2,764,606, the alkyl trithiometaphosphates are conveniently obtained by reacting a lower alkyl mercaptan with phosphorus pentasulfide. The lactone reactant may be any of the various lactones, including by way of example β-propiolactone, γ-valerolactone, δ-valerolactone, β-angelica lactone, γ-butyrolactone, etc. The two reactants are usually employed in approximately equimolecular proportions, although an excess of the lactone may be employed to insure complete consumption of the phosphate reactant. Use of the latter in excess is usually not desirable since the un- reacted phosphate is often difficult to separate from the polymeric reaction product.

The reaction by which the new products are formed takes place readily simply upon admixture of the two reactants at atmospheric temperatures and in the absence of polymerization or condensation catalysts. Usually the reaction is exothermic to such an extent that when operating with any sizeable quantity of reactants the reaction vessel should be equipped with cooling coils or other means for dissipating the exothermic heat of reaction. The use of an inert reaction solvent, e. g., diethyl ether, chloroform, carbon tetrachloride, benzene, toluene, etc., is also of assistance in absorbing and dissipating the heat of reaction, and conducting the reaction in the presence of such a solvent constitutes a preferred mode of operation. The reaction vessel may be fitted with a reflux condenser to prevent loss of the solvent.

The reaction is preferably carried out at atmospheric pressure, and the temperature is maintined below the atmospheric boiling point of the lowest-boiling component of the reaction mixture, although higher temperatures and superatmospheric pressures may be employed if desired. In the interests of simplifying the problem of heat dissipation, the reaction temperature is usually maintained below about 200° C.

Upon completion of the reaction, the product is purified by evaporating or distilling off the reaction solvent and any unreacted lactone. The reaction products themselves are very high-boiling and are distillable only under very high vacuum; accordingly, they are usually employed without further purification. In some cases they may be subjected to extraction with an organic solvent.

As initially obtained, the novel reaction products of the invention usually take the form of high-boiling viscous liquids which are generally soluble in polar solvents, e. g., chloroform and the like, but are generally insoluble in non-polar solvents. They are substantially light- and heat-stable, and are compatible with a variety of synthetic resins and plastics. Upon heating, e. g., at 100°–200° C. for 2–60 minutes, these liquid products further polymerize or condense to form resinous or rubber-like materials which are likewise soluble in a variety of polar solvents and are compatible with synthetic resins and plastics.

The following examples will illustrate several ways in which the principle of the invention may be applied, but are not to be construed as limiting the same:

Example I

Approximately 324 parts by weight (0.3 mole) of ethyl metaphosphate are mixed with 450 parts by weight of chloroform, and the solution is placed in a reaction vessel equipped with a reflux condenser and an efficient stirring device. The vessel is then immersed in an ice bath and 216 parts by weight (0.3 mole) of β-propiolactone are added dropwise to the metaphosphate solution at such a rate that the reaction temperature does not rise above about 40° C. A vacuum device is then attached to the reaction vessel, and vacuum is applied until all the chloroform has been evaporated. The resulting product is a light tan viscous liquid which is substantially undistillable under 2 mm. pressure. It is soluble in chloroform and dimethyl formamide.

Example II

The procedure of Example I is repeated, substituting 350 parts by weight of γ-valerolactone for the β-propiolactone. Upon completion of the reaction, the reaction product is heated to 150° C. under 2 mm. pressure to remove the solvent and reacted γ-valerolactone. The undistilled product is a very viscous liquid which polymerizes or condenses to a light brown resin upon heating at 120° C. for 15 minutes.

*Example III*

The procedure of Example I is repeated, substituting 426 parts by weight of methyl trithiometaphosphate for the ethylmetaphosphate and substituting diethyl ether for the chloroform. After evaporating off the chloroform, the polymeric product is obtained as a yellow viscous liquid which further polymerizes to a semi-soft resin upon heating at 100° C. for 30 minutes.

I am aware that it is known to prepare dialkyl esters of carbalkoxy-alkanephosphates by reacting trialkyl phosphites with lactones. The products of the present invention, however, are entirely different in that they contain fewer alkyl groups, have much higher boiling points, and contain substantially no carbon-to-phosphorus bonds.

Other modes of applying the principle of my invention may be employed instead of those explained, change being made as regards the methods or materials employed, provided the products or steps stated by any of the following steps, or the equivalent of such stated products or steps, be obtained or employed.

I, therefore, particularly point out and distinctly claim as my invention:

1. The product of reaction between a lactone and an organic phosphorous compound of the general formula:

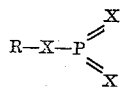

wherein R represents an alkyl radical containing from 1 to 4 carbon atoms and X represents a divalent element selected from the class consisting of oxygen and sulfur, in substantially equimolecular proportions.

2. A product as defined in claim 1 wherein X represents oxygen.

3. A product as defined in claim 1 wherein X represents sulfur.

4. A product as defined in claim 1 wherein the said organic phosphorous compound is ethylmetaphosphate.

5. A product as defined in claim 1 wherein the said organic phosphorous compound is methyl trithiometaphosphate.

6. The reaction product of ethylmetaphosphate and β-propiolactone.

7. The reaction product of methyl trithiometaphosphate and β-propiolactone.

8. The reaction product of ethyl metaphosphate and γ-valerolactone.

9. The process which comprises reacting a lactone with an organic phosphorous compound of the general formula:

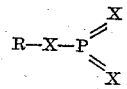

wherein R represents an alkyl group containing from 1 to 4 carbon atoms and X represents a divalent element selected from the class consisting of oxygen and sulfur, at a reaction temperature below about 200° C., at least about one mole of said lactone being provided for each mole of said phosphorus compound.

10. The process of claim 9 wherein the said reaction is conducted in the presence of an inert liquid reaction medium.

11. The process of claim 9 wherein the said organic phosphorous compound is a metaphosphate.

12. The process of claim 9 wherein the said organic phosphorous compound is a trithiometaphosphate.

No references cited.